United States Patent
Almasmoum et al.

(10) Patent No.: US 11,201,790 B2
(45) Date of Patent: Dec. 14, 2021

(54) SYSTEM AND METHOD FOR VIRTUAL PRIVATE NETWORK CONNECTIVITY

(71) Applicant: Saudi Arabian Oil Company, Dhahran (SA)

(72) Inventors: Hani S Almasmoum, Khobar (SA); Mansour Almutairi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 6 days.

(21) Appl. No.: 16/366,535

(22) Filed: Mar. 27, 2019

(65) Prior Publication Data
US 2020/0313970 A1    Oct. 1, 2020

(51) Int. Cl.
H04L 12/24    (2006.01)
H04L 12/46    (2006.01)

(52) U.S. Cl.
CPC ...... H04L 41/0896 (2013.01); H04L 12/4641 (2013.01); H04L 41/0806 (2013.01)

(58) Field of Classification Search
CPC ............ H04L 41/0896; H04L 12/4641; H04L 41/0806
See application file for complete search history.

(56) References Cited

U.S. PATENT DOCUMENTS

| | | | |
|---|---|---|---|
| 6,449,650 B1 * | 9/2002 | Westfall | H04L 12/5601 709/227 |
| 6,909,700 B1 * | 6/2005 | Benmohamed | H04L 41/145 370/231 |
| 7,631,059 B2 | 12/2009 | Chang et al. | |
| 8,909,766 B1 * | 12/2014 | Hegg | H04L 41/026 709/224 |
| 10,469,304 B1 * | 11/2019 | Kempe | H04L 63/0272 |
| 2002/0075901 A1 * | 6/2002 | Perlmutter | H04L 47/805 370/468 |
| 2002/0091663 A1 * | 7/2002 | Mikami | H04L 47/20 |

(Continued)

FOREIGN PATENT DOCUMENTS

CN    104468408 A1    3/2015

OTHER PUBLICATIONS

L. Keng Lim, et al., "Customizable Virtual Private Network Service with QoS," Computer Networks 36 (2001) pp. 137-151.

(Continued)

*Primary Examiner* — Alpus Hsu
*Assistant Examiner* — Camquyen Thai
(74) *Attorney, Agent, or Firm* — Leason Ellis LLP

(57) ABSTRACT

A system, a method, and a computer program are provided for provisioning a network connectivity link to a node in a virtual private network. The method includes receiving a connectivity link change request that includes a request to change a bandwidth allocation for the network connectivity link, retrieving network connectivity information, applying the request to change the bandwidth allocation to the current bandwidth value and changing the bandwidth allocation for the connectivity link, evaluating the bandwidth values for all network connectivity links in the virtual private network, determining whether the sum of bandwidths exceeds the aggregate bandwidth value, and configuring a router with the updated bandwidth allocation to effectuate the updated bandwidth allocation in said network connectivity link.

17 Claims, 9 Drawing Sheets

(56) References Cited

U.S. PATENT DOCUMENTS

| | | | | |
|---|---|---|---|---|
| 2003/0079043 A1* | 4/2003 | Chang | ................ | H04L 12/4641 709/249 |
| 2004/0028054 A1 | 2/2004 | Khurana et al. | | |
| 2006/0176808 A1* | 8/2006 | Isobe | ...................... | H04L 47/10 370/229 |
| 2008/0130515 A1* | 6/2008 | Vasseur | ............... | H04L 63/0272 370/254 |
| 2009/0129405 A1* | 5/2009 | Lauwers | ............ | H04L 65/1046 370/468 |
| 2009/0225762 A1* | 9/2009 | Davidson | ........... | H04L 12/4675 370/401 |
| 2010/0265887 A1* | 10/2010 | Keum | ................. | H04L 12/2812 370/328 |
| 2010/0309927 A1* | 12/2010 | Aubin | ................ | H04L 41/0896 370/409 |
| 2011/0069625 A1* | 3/2011 | Michaelis | ............. | H04L 65/601 370/252 |
| 2012/0236877 A1* | 9/2012 | Weeks | .................. | H04L 41/145 370/468 |
| 2015/0304238 A1* | 10/2015 | Brown | .................. | H04L 47/808 370/235 |
| 2015/0350280 A1* | 12/2015 | Roverso | ................ | H04L 65/602 709/219 |
| 2016/0094458 A1* | 3/2016 | Bostick | ................. | H04L 47/122 370/229 |
| 2016/0286452 A1* | 9/2016 | Tian | ...................... | H04W 28/08 |
| 2018/0227165 A1* | 8/2018 | Philip | .................... | H04L 47/70 |

OTHER PUBLICATIONS

A brochure, titled "A Better Way to Reach the Cloud," by Gartner, Issue 1.
International Search Report and Written Opinion in Corresponding PCT Application No. PCT/US2020/024623 dated May 29, 2020. 12 pages.

* cited by examiner

FIG. 8A

| PROVISION REQUEST | VALUE |
|---|---|
| Request Type | IP VPN Link |
| Bandwidth (Mbps) | 20 Mbps |
| Location 1 | Master Node: 10 Mbps |
| Location 2 | Branch Node 1: 2 Mbps |
| Location 3 | Branch Node 2: 2 Mbps |
| Location 4 | Branch Node 3: 2 Mbps |
| Location 5 | Branch Node 4: 3 Mbps |
| Location 6 | Branch Node 5: 1 Mbps |
| ADD LOCATION | ADD VALUE |

600A

| PROVISION REQUEST | VALUE |
|---|---|
| Request Type | IP VPN Link |
| Bandwidth (Mbps) | 20 Mbps |
| Location 1 | Master Node: 10 Mbps |
| Location 2 | Branch Node 1: 2 Mbps |
| Location 3 | Branch Node 2: 4 Mbps |
| Location 4 | Branch Node 3: 2 Mbps |
| Location 5 | Branch Node 4: 4 Mbps |
| Location 6 | Branch Node 5: 1 Mbps |
| ADD LOCATION | ADD VALUE |

SYSTEM AND METHOD FOR VIRTUAL PRIVATE NETWORK CONNECTIVITY

FIELD OF THE DISCLOSURE

The present disclosure relates to a system, method and computer program for developing virtual private network connectivity between client devices in a network system, including controlling bandwidth allocation for one or more connectivity links in a virtual private network.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, and optical networking technologies. The Internet carries a broad range of information resources and services, including the World Wide Web (WWW), electronic mail, telephony, and file sharing.

As the Internet evolves and network systems become increasingly under attack, technology solutions such as virtual private networks (VPNs) are taking on greater importance. A VPN can extend a private network across a public network such as the Internet and provide secure communication between communicating devices by establishing a secure point-to-point connection between the devices. VPNs typically implement tunneling and encryption technologies to prevent unauthorized access to the data carried between the communicating devices.

Early on, private network systems were built using dedicated hardware and electrical communication lines. These early network systems proved to be expensive to build and maintain. So, when less costly Frame Relay (FR) and Asynchronous Transfer Mode (ATM) technologies became available, network developers looked to these technologies to provide virtual circuits to carry data between communicating devices. Typically, these virtual circuits are provided by networks that are owned and operated by service providers such as, for example, telecommunications carriers. Due to significant limitations of FR/ATM-based network systems, however, these technologies are being replaced by IP-based VPN technology solutions such as IP tunneling and IP/Multi-protocol Label Switching (MPLS) technologies.

Current IP-based technologies, such as MPLS, have become benchmarks for VPN technology solutions, providing secure data transmission over public networks at significant cost-reduction and increased bandwidth. However, implementation of these IP-based technologies has resulted in network systems that are inflexible and inefficient when developing virtual private network connectivity. There exists a great unmet need for a technology solution that can provide flexible and efficient virtual private network connectivity in network systems.

SUMMARY OF THE DISCLOSURE

The disclosure provides an IP-based technology solution, including a method, a system, and a computer program therefor, that provides flexible and efficient virtual private network connectivity in a network. According to an aspect of the disclosure, a method is provided for provisioning a network connectivity link to a node in a virtual private network. The method comprises: receiving a connectivity link change request that includes a request to change a bandwidth allocation for the network connectivity link; retrieving network connectivity information that includes an aggregate bandwidth value for the virtual private network and bandwidth values for all network connectivity links in the virtual private network, including a current bandwidth value for said network connectivity link; applying the request to change the bandwidth allocation to the current bandwidth value and changing the bandwidth allocation for said connectivity link to an updated bandwidth allocation; evaluating the bandwidth values for all network connectivity links in the virtual private network, including the updated bandwidth allocation, to determine a sum of bandwidths; comparing the sum of bandwidths to the aggregate bandwidth value; determining whether the sum of bandwidths exceeds the aggregate bandwidth value; and configuring a router with the updated bandwidth allocation to effectuate the updated bandwidth allocation in said network connectivity link.

The configuring the router with the updated bandwidth allocation can occur when the sum of bandwidths is equal to, or less than the aggregate bandwidth value.

The connectivity link change request can be received from a network router located in the node.

The connectivity link change request can be received from a server in the node.

The method can further comprise sending a notification to the node, wherein the notification includes a confirmation that the request to change the bandwidth allocation for said network connectivity link is effectuated.

The notification can include a router configuration that effectuates the request to change the bandwidth allocation.

The method can further comprise updating VPN network connectivity bundle information in a database, the updating being based on the request to change the bandwidth allocation.

According to another aspect of the disclosure, a system is provided for provisioning a network connectivity link to a node in a virtual private network. The system comprises: a database that stores network connectivity information for the virtual private network; and a controller that: receives a connectivity link change request that includes a request to change a bandwidth allocation for said network connectivity link; retrieves an aggregate bandwidth value for the virtual private network and bandwidth values for all network connectivity links in the virtual private network from the database, including a current bandwidth value for said network connectivity link; applies the request to change the bandwidth allocation to the current bandwidth value and changes the bandwidth allocation for said connectivity link to an updated bandwidth allocation; evaluates the bandwidth values for all network connectivity links in the virtual private network, including the updated bandwidth allocation, to determine a sum of bandwidths; compares the sum of bandwidths to the aggregate bandwidth value; determines whether the sum of bandwidths exceeds the aggregate bandwidth value; and sends via a network interface a router configuration with the updated bandwidth allocation to effectuate the updated bandwidth allocation in said network connectivity link.

In the system, the controller can generate the router configuration when the sum of bandwidths is equal to, or less than the aggregate bandwidth value.

In the system, the connectivity link change request can be received from a network router located in the node.

In the system, the connectivity link change request can be received from a server in the node.

In the system, the controller can send a notification to the node that includes a confirmation that the request to change the bandwidth allocation for said network connectivity link is effectuated.

In the system, the notification can include a router configuration that effectuates the request to change the bandwidth allocation.

In the system, the network connectivity information in the database can comprise VPN network connectivity bundle information that is updated based on the request to change the bandwidth allocation.

According to a further aspect of the disclosure, a non-transitory computer readable storage medium is provided that stores network connectivity link provisioning program instructions for causing a network connectivity link to be provisioned to a node in a virtual private network. The program instructions comprise the steps of: receiving a connectivity link change request that includes a request to change a bandwidth allocation for the network connectivity link; retrieving network connectivity information that includes an aggregate bandwidth value for the virtual private network and bandwidth values for all network connectivity links in the virtual private network, including a current bandwidth value for said network connectivity link; applying the request to change the bandwidth allocation to the current bandwidth value and changing the bandwidth allocation for said connectivity link to an updated bandwidth allocation; evaluating the bandwidth values for all network connectivity links in the virtual private network, including the updated bandwidth allocation, to determine a sum of bandwidths; comparing the sum of bandwidths to the aggregate bandwidth value; determining whether the sum of bandwidths exceeds the aggregate bandwidth value; and configuring a router with the updated bandwidth allocation to effectuate the updated bandwidth allocation in said network connectivity link.

The program instructions can comprise an additional step of sending a notification to the node, wherein the notification includes a confirmation that the request to change the bandwidth allocation for said network connectivity link is effectuated.

The program instructions can comprise an additional step of updating VPN network connectivity bundle information in a database, the updating being based on the request to change the bandwidth allocation.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

FIGS. 8A and 8B show an example of displays that can be rendered by a graphic user interface (GUI), according to the principles of the disclosure.

Figure 1:
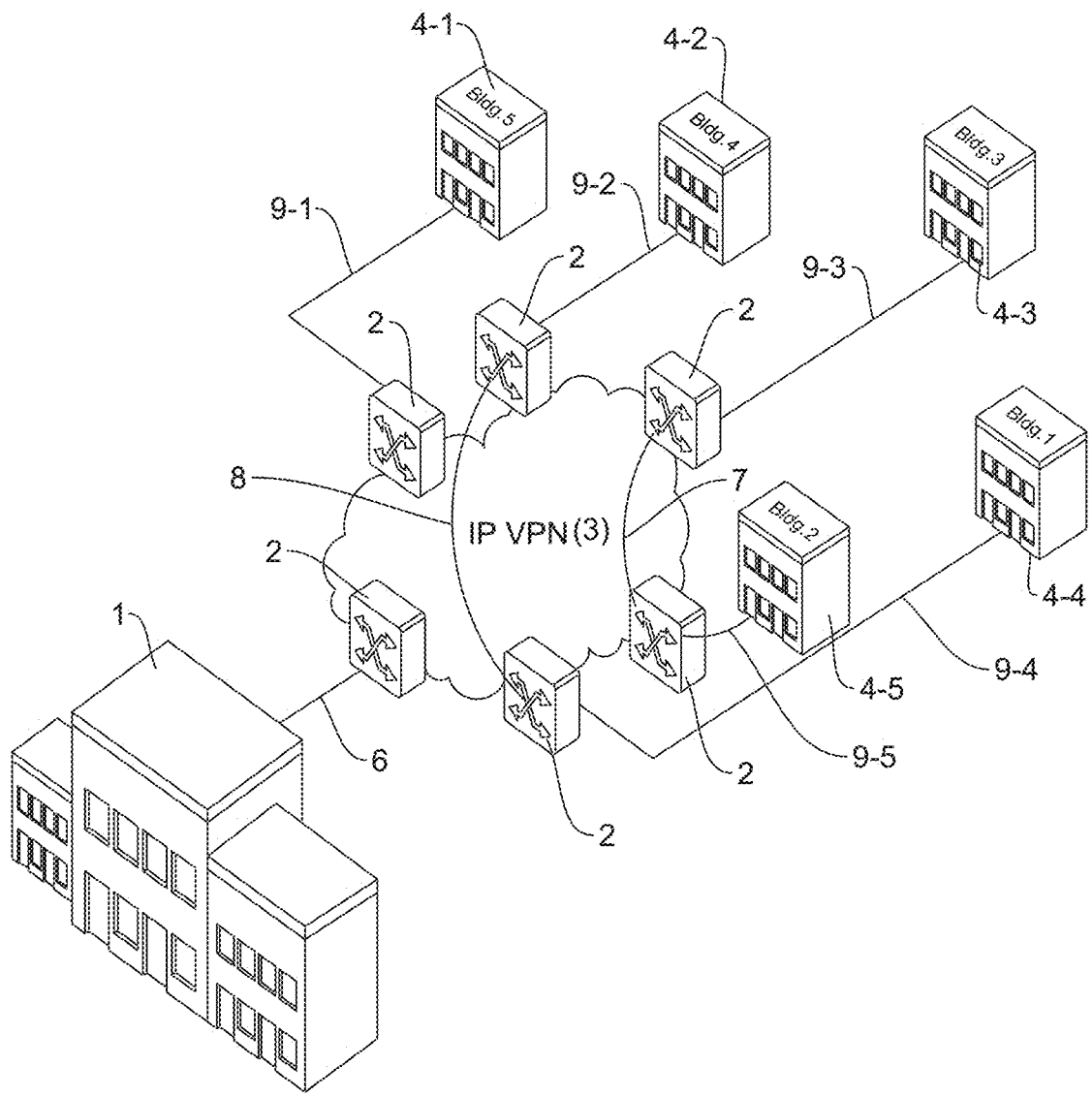
FIG. 1 shows an example of an Internet Protocol virtual private network system.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples used are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

FIG. 1 shows an example of an Internet Protocol (IP) virtual private network (VPN) system. The IP VPN system includes a headquarters building 1, a plurality of routers 2, a public network 3, and a plurality of remotely located branch buildings 4 (including buildings 4-1, 4-2, 4-3, 4-4, 4-5). The headquarters building 1 and branch buildings 4 can each include one or more private networks. The IP VPN system facilitates secure connectivity between the headquarters building 1 and the plurality of branch buildings 4 via the plurality of routers 2 over a plurality of connectivity links 6 and 9 (including connectivity links 9-1, 9-2, 9-3, 9-4, 9-5).

According to a non-limiting example, the IP VPN system (shown in FIG. 1) can be facilitated by a service provider (not shown). In this non-limiting example, the service provider can assign the headquarters building 1 a bandwidth of 10 Mbps (or megabytes-per-second) for the connectivity link 6 and an aggregate bandwidth of 10 Mbps for all of the branch connectivity links 9, with a bandwidth of 2 Mbps for each of connectivity links 9-1 and 9-3, a bandwidth of 4 Mbps for connectivity link 9-2, and a bandwidth of 1 Mbps for each connectivity links 9-4 and 9-5.

In the IP VPN system, an enterprise network system acquires individual IP VPN connectivity links with specific bandwidth allocations for each connectivity link from the service provider. The service provider sets the acquired bandwidth allocations for each connectivity link and stores the settings. The bandwidth allocations can be memorialized in a contract between the enterprise network (e.g., headquarters building 1) and the service provider (not shown), and monthly subscriptions can be paid to the service provider pursuant to the contracts for each connectivity link. The IP VPN system has significant disadvantages, including a requirement that the enterprise network communicate repeatedly with the service provider over protracted periods of time for each change in bandwidth allocation for a connectivity link.

For example, to accommodate any bandwidth changes, the enterprise network must communicate with the service provider to modify the bandwidth allocations, which can require negotiation of new contracts for each modified connectivity link. Then, based on the terms of each contract, the service provider must update its billing system, perform configuration changes to the connectivity links, and communicate with the enterprise network when the connectivity link changes have been implemented, so that the enterprise network can perform required changes on its network routers.

For any bandwidth change to take effect in the IP VPN system, each of the following time-consuming and resource-intense steps must be carried out in the following order: a request must be communicated to the service provider to accommodate the required upgrade or downgrade in bandwidth; a new contract must be negotiated and executed with the service provider, including new contract terms and conditions; the service provider must perform a new design package with the requested bandwidth change once the contract is approved and accepted; the service provider must communicate the bandwidth change to the service provider's internal finance system to effectuate the change, including updating bill information for the connectivity link(s); the services provider must perform the configuration changes on connectivity links by sending a configuration request to commission a technical team; the service provider must provide information about the change in bandwidth allocation for the connectivity link and confirmation that the change has been implemented; and the change must be carried out at the enterprise network router. The foregoing process must be carried out separately each time a bandwidth allocation change is to be made for a connectivity link, and for each connectivity link in a network system that might be affected by such bandwidth allocation change.

The IP VPN system is very inefficient in large scale network systems that can involve changes to numerous connectivity links, which require numerous reconfigurations, amendments to each existing contract associated with a respective connectivity link, including negotiations for each connectivity link between the enterprise network and the service provider. Also, the billing process must be adjusted each time any changes are made to subscription payment details (such as, for example, payment amount, payment date, or billing contact). Both contract and payment changes are limited and restricted to the terms and conditions in the contracts between enterprise network and service provider. Resultantly, any changes to bandwidth allocations are very expensive, time consuming, and challenging to implement, including implementations that need to be made in existing bill tracking systems. With large numbers of connectivity links, service providers must perform many system configuration changes as well as billing configuration changes each time, thereby exposing the IP VPN system to errors resulting from misconfigurations or erroneous changes to billing system information, and negatively affecting provisioning of connectivity links in the IP VPN system.

Figure 2:
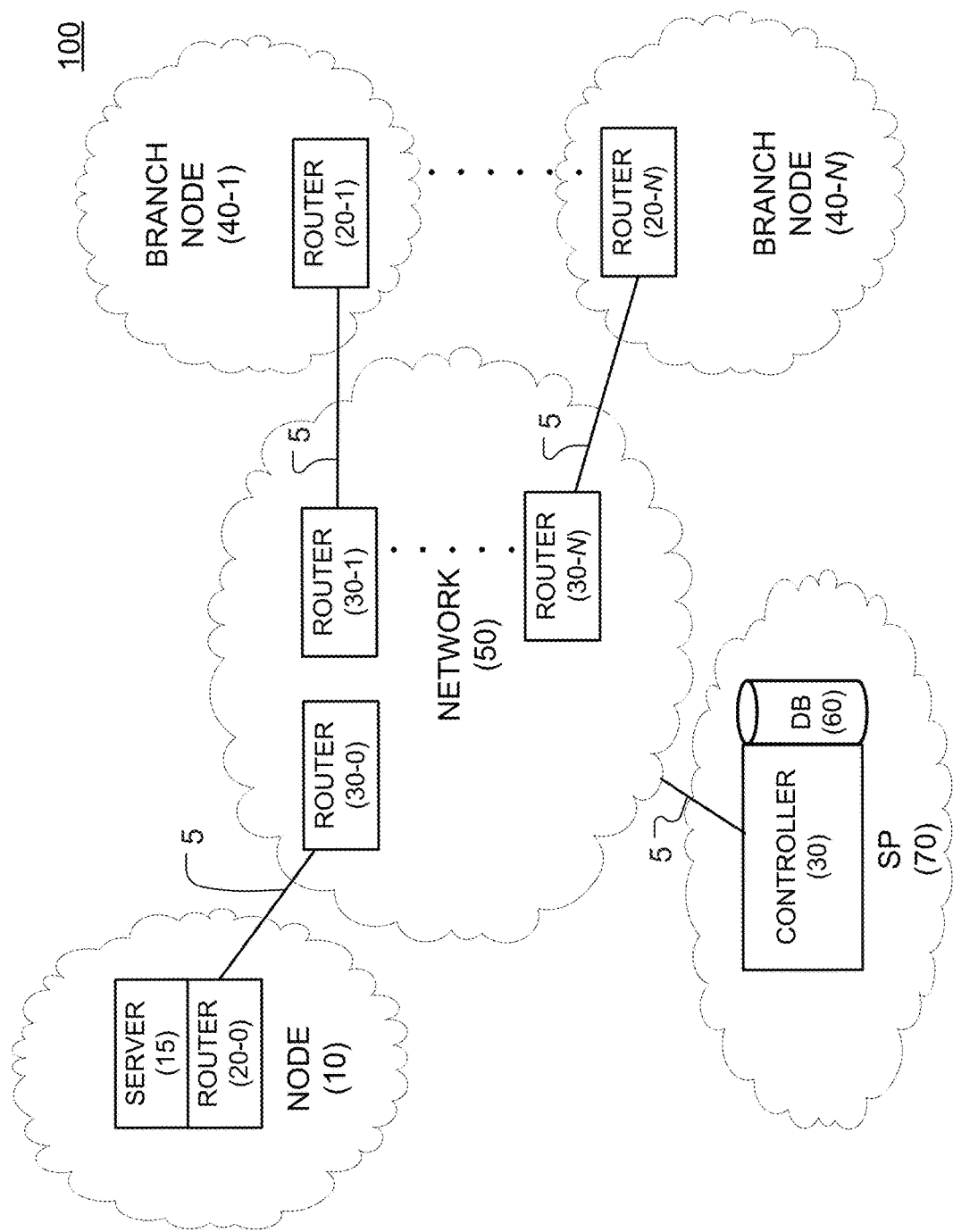
FIG. 2 shows an example of a network system that is constructed according to the principles of the disclosure.

FIG. 2 shows an example of a network system 100 that is constructed according to the principles of the disclosure. The network system 100 includes a master node 10, a plurality of routers 30-0 to 30-N, a controller 30, and a plurality branch nodes 40-1 to 40-N (N is a positive integer greater than 1), any one or more of which can be connected in or to a network 50 over communication links 5. In the network system 100, each of the branch nodes 40-1 to 40-N can be connected to the node 10 through a single virtual private network (VPN), thereby providing flexible and continuous data traffic exchange between the nodes, regardless of geographic location of the nodes. The network 50 can include a network provisioned by a service provider, such as, for example, an Internet service provider (ISP). One or more of the routers 30-1 to 30-N can be provisioned by the service provider. The network 50 can include a private or a public network. The network system 100 can include a database 60, which can be connected to the controller 30 via a communication link 5 or included in the controller 30.

The node 10 includes a communicating device (not shown) or a network of communicating devices, such as, for example, a private enterprise network in the headquarters building 1 (shown in FIG. 1). The node 10 can include a server 15, or the server 15 can be located external to the node 10 and connected to the node 10 via a communication link. The node 10 can include a router 20-0.

Figure 3:
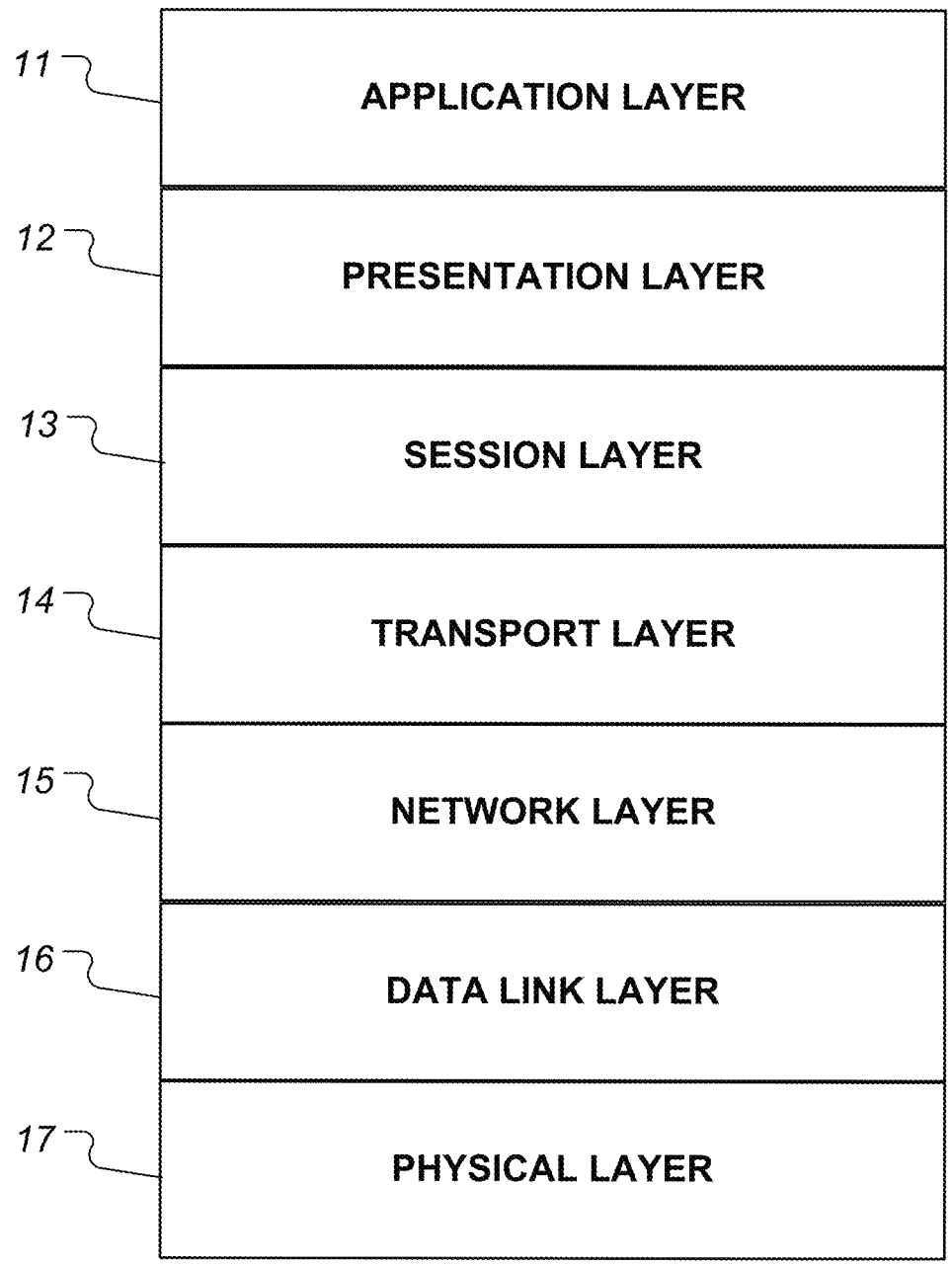
FIG. 3 shows a representation of the seven-layer OSI model.
Figure 4:
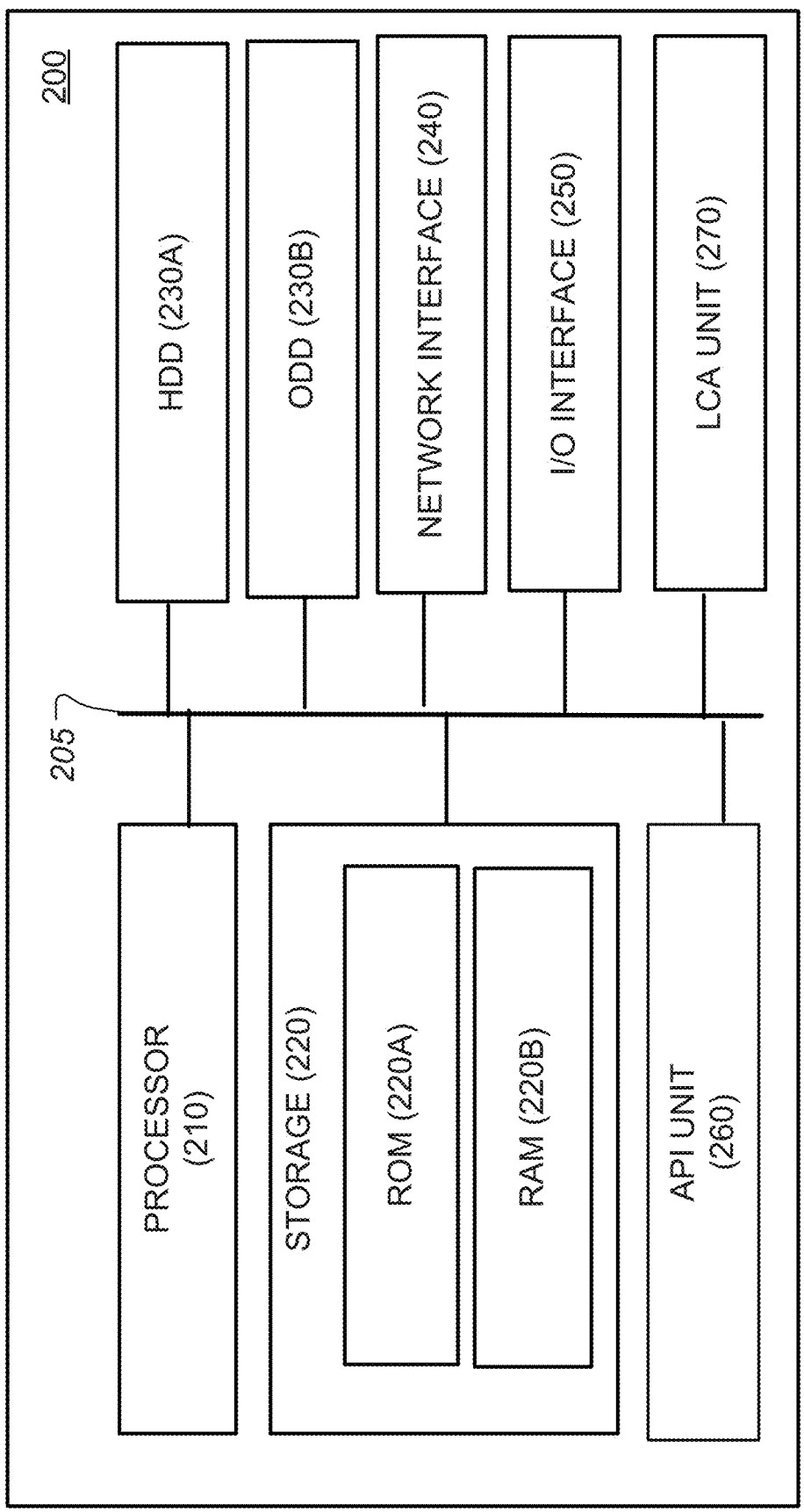
FIG. 4 shows an example of a virtual private network bandwidth manager that can be included in a server in the network system shown in FIG. 2.

The server 15 comprises a virtual private network (VPN) bandwidth manager 200 (shown in FIG. 4). The VPN bandwidth manager 200 can adjust and control bandwidth restrictions on one or more connectivity links provisioned by service provider network equipment, including, for example, the routers 30-0 to 30-N. The connectivity link(s) can be provisioned at the physical layer (for example, layer 7 of the OSI model, shown in FIG. 3) or the data link layer (for example, OSI layer 6, shown in FIG. 3). The connectivity link(s) can include leased lines, provisioned by the service provider. The VPN bandwidth manager 200 can adjust and control bandwidth restrictions such that the sum of all bandwidths on all connectivity links to the node 10 and the branch nodes 40 equals a constant aggregate bandwidth value $B_{TOTAL}$. The connectivity links can carry all kinds of data traffic, including, for example, IP traffic, Voice over IP (VoIP), OSI-layer 7 traffic, or OSI-layer 6 traffic. The connectivity links can be implemented to consolidate ATM, Frame Relay, Voice, and IP networks into one unified network infrastructure that includes the node 10 and all of the branch nodes 40.

Each router 20-0 to 20-N or 30-0 to 30-N can include an edge router, a subscriber edge router, an inter-provider border router, a core router, a label switch router (LSR), a switch, a gateway server, an access server, or any combination of the foregoing. The router 20-0 can be included in the node 10 and linked to the router 30-0, which can be provided by the service provider. The routers 30-1 to 30-N can be provided by the service provider. Similarly, one or more of the routers 20-1 to 20-N can be included in one or more of the branch nodes 40-1 to 40-N, respectively. The router 20-0 can operate as a proxy for instruction and data signals between the server 15 and routers 20-1 to 20-N.

The routers 20-0 . . . 20-N, 30-0 . . . 30-N can create pathways for data traffic between the node 10 and branch nodes 40, directly across physical links or virtual circuits provisioned by the service provider, thereby providing a VPN. One or more of the routers 20-0 to 20-N can be configured and controlled by the server 15. The routers 20-0 to 20-N can be configured to initiate communication and facilitate transmission of data packets to/from the controller 30. Any one of the routers 20-0 to 20-N (or any of routers 30-0 to 30-N) can atomically send a request signal to the controller 30 to request a change to the bandwidth allocated for a connectivity link, including, for example, a request to increase or decrease a bandwidth allocation for the connectivity link. One or more of the routers 30-1 to 30-N can be configured by the controller 30.

Each of the routers 20-0 to 20-N, 30-0 to 30-N can include, for example, a routing table, a routing daemon, a signaling daemon, a routing policy, a packet scheduler, a packet classifier, or a programmable interface. Each router can be reconfigurable. The routers 20-0 to 20-N, 30-0 to 30-N can receive and forward data packets between nodes in the network system 100. The data packets can include encrypted data.

The controller 30 can include a server (not shown), a router (not shown), and a switch (not shown). The controller 30 can be located in a service provider (SP) network 70, or external to the service provider network 70 and connected to the service provider network 70 via a communication link. Although shown as a separate entity, the service provider network 70 can be part of, or include the network 50. The SP network 70 can include the database 60, which can be connected to the controller 30 via a communication link, or the database 60 can be included in the controller 30. The controller 30 can include a master node (MN) bandwidth manager 300 (shown in FIG. 5). The MN bandwidth manager 300 can communicate with the node 10. The controller 30 can communicate with each of the routers 30-0 to 30-N.

The controller 30 can include a network router interface (not shown) that can communicate with each of the routers 20-0 to 20-N (and routers 30-0 to 30-N). The controller 30 can automate operations for the routers 20-0 to 20-N (and 30-0 to 30-N). For instance, any one or more of the routers 20-0 to 20-N can communicate with the controller 30 and atomically request a change to the bandwidth allocated for a connectivity link to the particular router(s), including requested bandwidth upgrades or downgrades, which can be based on usage of the connectivity link. For example, where one of a plurality of connectivity links experiences significant increased bandwidth demand, a request can be generated by the associated router(s) and atomically communicated to the controller 30 to request an increase in the bandwidth allocation for the connectivity link consistent with the increased bandwidth demand. The request can be processed within the controller 30, which can assess the requested bandwidth change (for example, upgrade or downgrade), calculate the sum of bandwidth allocations (with the requested change) for all connectivity links provisioned in the VPN (for example, by the controller 30), and, based on a comparison of the calculated sum of bandwidths to the aggregate bandwidth allocated to the VPN, either approve the request and send the new configuration(s) to the appropriate one or more of the routers 30-0 to 30-N, or reject the request.

Figure 5:
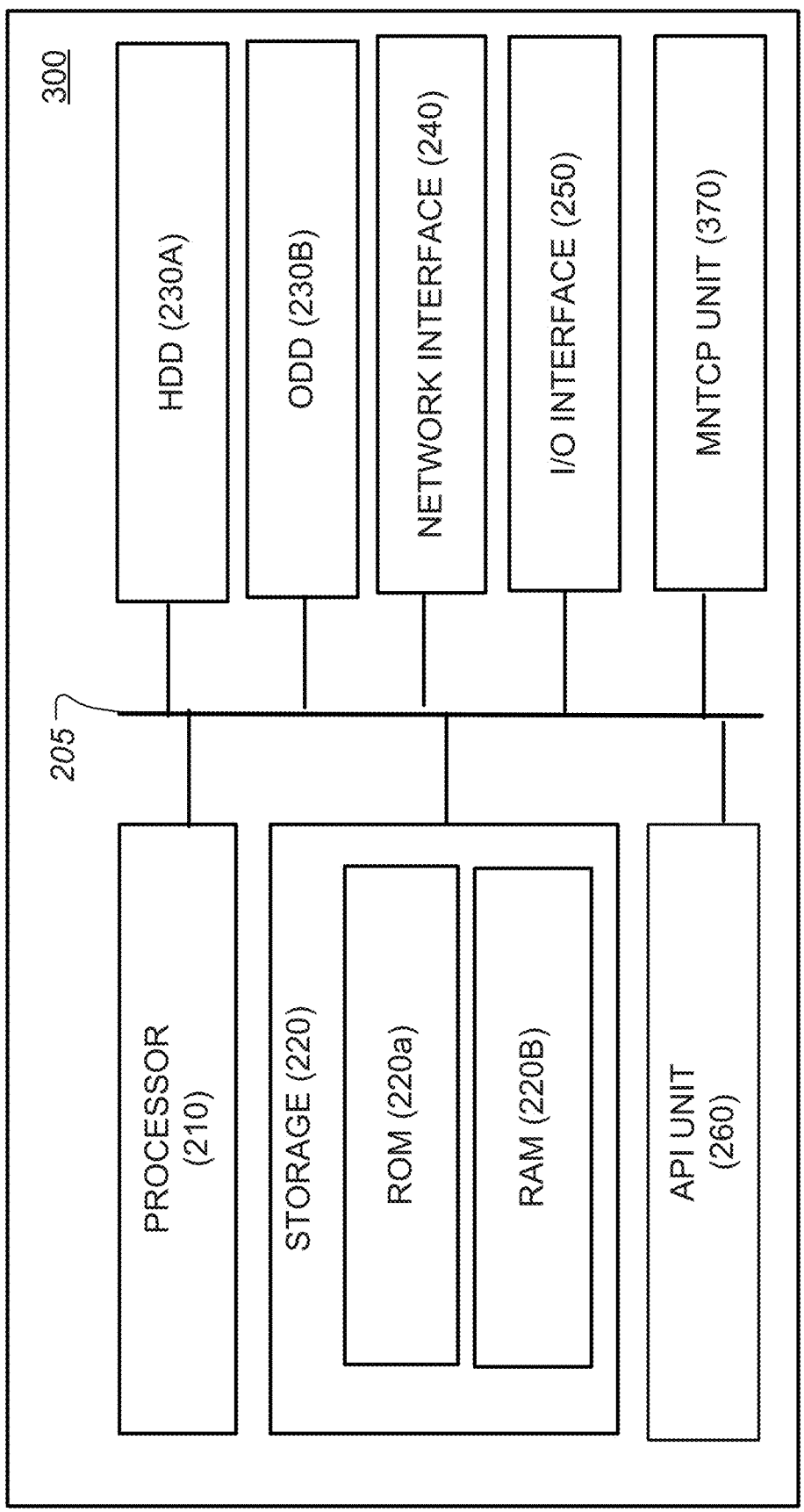
FIG. 5 shows an example of a master node bandwidth manager that can be included in a controller in the network system shown in FIG. 2.

In a non-limiting example of the disclosure, one or more of the routers 20-0 to 20-N (or routers 30-0 to 30-N) can communicate with, for example, an application program interface (API) in the server 15 (for example, an API unit 260 in the VPN bandwidth manager 200, shown in FIG. 4) or in the controller 30 (for example, the API unit 260 in the MN bandwidth manager 300, shown in FIG. 5). The API can include an XML API, such as, for example, an API compatible with Extensible Markup Language (XML) processing. The XML API can support available transport layers such as terminal-based protocols, including, for example, Telnet, Secure Shell (SSH), dedicated-TCP connection, or Secure Sockets Layer (SSL) dedicated TCP connection. The API can configure one or more of the routers 20-0 to 20-N, or request information about configuration, management or operation of the router(s). The API can facilitate building a custom end-user interface for configuration and information retrieval and display.

The API can provide an interface to a router 20-N that can be used to develop client applications and scripts (for example, a Perl script) to manage or monitor the router 20-N. The interface can include an XML interface that can be specified by XML schemas. The API can exchange formatted request or response streams for configuring or monitoring the router 20-N. The router 20-N can process a request and send the request to the controller 30. The controller can comprise a secure router. The controller 30 can relay the request to the server 15 (or respond to the router 20-N). The server 15 (or controller 30) can respond by, for example, encoding a response in XML API tags, which can be received by the router 20-N to update or change the router configuration, including bandwidth.

A top level of a request sent by the router 20-N to the controller 30 can begin with an XML declaration tag, followed by a request tag and one or more operation type tags. Similarly, every response returned to the router 20-N can begin with an XML declaration tag followed by a response tag, one or more operation type tags, and a result summary tag with an error count. A response can contain operation tags for each supported operation type. The operation type tags contained in the response can correspond to those contained in the router request.

Following an XML declaration tag, the router 20-N can enclose each request stream within a pair of <Request> start and </Request> end tags. The controller 30 can enclose each XML response within a pair of <Response> start and </Response> end tags. Major and minor version numbers can be carried on the <Request> and <Response> elements to indicate the overall XML API version in use by the controller 30 and router 20-N, respectively.

The following is an example of an XML request that can be sent by the router 20-N.

```
<?xml version="1.0" encoding="UTF-8"?>
<Request MajorVersion="1" MinorVersion="0">
    <Operation>
        <AAA> "authentication protocol" </AAA>
        <request>
            <commandNo>CustomerRequestNo</commandNo>
            <status>request</status>
            <bandwidth>"New bandwidth in Mpbs</bandwidth>
        </request>
    </Operation>
</Request>
```

The following is an example of an XML request that can be sent by the controller 30.

```
<?xml version="1.0" encoding="UTF-8"?>
<Response MajorVersion="1" MinorVersion="0">
    <Operation>
        <AAA> "authentication protocol" </AAA>
        <requeset>
            <commandNo>CustomerRequestNo</commandNo>
            <status>approved</status>
            <bandwidth>"New bandwidth in Mpbs</bandwidth>
```

-continued

```
    </request>
  </Operation>
</Response>
```

If it is determined that there is not enough aggregated bandwidth within a package to accommodate a bandwidth change request, the controller 30 can reply with a <response> response and <status> reject.

The MN bandwidth manager 300 (shown in FIG. 5) can create, configure and communicate with the VPN bandwidth manager 200 (shown in FIG. 4) to provision the master node 10 (shown in FIG. 2) with a VPN connectivity bundle to create a VPN. The VPN connectivity bundle can include a plurality of provisioned links between the node 10 and the plurality of branch nodes 40 that form the VPN. In response to instruction and data signals received from any one of the routers 30-0 to 30-N (or any of the routers 20-0 to 20-N) or the VPN bandwidth manager 200, the MN bandwidth manager 300 can change bandwidth allocations for any one or more of the plurality of provisioned links, such that the sum of all the allocated bandwidths remains constant and equal to, or less than the aggregate bandwidth value $B_{TOTAL}$ allocated for the VPN connectivity bundle, thereby providing flexibility in adding, removing, upgrading or downgrading the assigned bandwidth per node, without necessitating changes to systems or information in the service provider network 70, such as, for example, contracts, billing information, etc.

The MN bandwidth manager 300 can configure, store and manage the aggregate bandwidth value $B_{TOTAL}$ for all connectivity links provisioned to the node 10 and branch nodes 40-1 to 40-N. The MN bandwidth manager 300 can configure, store and manage the aggregate bandwidths for additional connectivity links between another master node (not shown) and its branch nodes (not shown). The MN bandwidth manager 300 can receive instructions and data from any of the routers 30-0 to 30-N (or 20-0 to 20-N) or the VPN bandwidth manager 200 and store bandwidth assignments $B_0$ to $B_N$ for the respective connectivity links to the node 10 and each of the branch nodes 1 to N, where bandwidth $B_0$ is the bandwidth allocated to the connectivity link to the node 10, and bandwidths $B_1$ to $B_N$ are the bandwidths allocated to the connectivity links to the branch nodes 40-1 to 40-N, respectively. The relationship between the aggregate bandwidth $B_{TOTAL}$ and the bandwidth allocations $B_0$ to $B_N$ is represented by the following equation.

$$B_{TOTAL} = \sum_{N}^{i=0} B_i$$

Each of the branch nodes 40-1 to 40-N can include a communicating device (not shown) or a network of communicating devices, such as, for example, a private network in one or more of the branch buildings 4 (shown in FIG. 1).

FIG. 3 shows a representation of the seven-layer OSI model. The various communicating devices (including the routers 20-0 to 20-N and 30-0 to 30-N) in the network system 100 can operate at the application layer 1, presentation layer 2, session layer 3, transport layer 4, network layer 5, link layer 6, or physical layer 7. Referring to FIG. 3, the application layer 1 is the OSI layer in a communicating device (not shown) that is closest to the user. The application layer 1 interacts with software applications in the communicating device that implement a communicating component. The application layer 1 can include, for example, a graphic user interface (GUI) or other computing resource with which the user can interact with to carry out a functionality.

The presentation layer 2 establishes context between software applications, which might use different syntax and semantics. The presentation layer 2 transforms data into a form that each software application can accept. An operating system is an example of the presentation layer 2.

The session layer 3 controls the connections between communicating devices in the network system 100, including, for example, the server 15, routers 20-0 to 20-N, 30-0 to 30-N, the controller 30, and the database 60 (shown in FIG. 2). This layer is responsible for establishing, managing and terminating connections between local and remote applications. The layer can provide for full-duplex, half-duplex, or simplex operations, and is responsible for establishing checkpointing, adjournment, termination, and restart procedures.

The transport layer 4 provides the functional and procedural mechanisms for transferring variable-length data packets (or sequences) from one communicating device to another communicating device, while maintaining quality-of-service (QoS). The transport layer 4 controls the reliability of a given connectivity link through flow control, segmentation and desegmentation, and error control. The transport layer 4 can include, for example, tunneling protocols, the Transmission Control Protocol (TCP) and the User Datagram Protocol (UDP).

The network layer 5 provides the functional and procedural mechanisms for transferring data packets from a node on a network to another node on a different network. The node can include the node 10 or any of the branch nodes 40-1 to 40-N, or a node in the node 10 or in any of the branch nodes 40-1 to 40-N. If the data to be transmitted is too large, the network layer 5 can facilitate splitting the data into a plurality of segments at the node and sending the fragments independently to the other node, where the segments can be reassembled to recreate the transmitted data. The network layer 5 can include one or more layer-management protocols such as, for example, routing protocols, multicast group management, network layer information and error, and network layer address assignment.

The link layer 6 is responsible for node-to-node transfer between nodes in the network system 100. In IEEE 802 implementations, the link layer 6 is divided into two sublayers, consisting of a medium access control (MAC) layer and a logical link control (LLC) layer. The MAC layer is responsible for controlling how devices in a network gain access to a medium and permission to transmit data. The LLC layer is responsible for identifying and encapsulating network layer protocols, and for controlling error checking and frame synchronization.

The physical layer 7 includes the hardware that connects the communicating devices in the network system 100, including, for example, the server 15, routers 20-0 to 20-N, 30-1 to 30-N, controller 30, or database 60. The hardware can include for example connectors, cables, switches, and the like, that provide for transmission and reception of instruction and data streams between the computing devices.

When communicating in the network system 100, each node can be identified by a unique identifier such as, for example, an Internet Protocol (IP) address, a MAC address, a network address, a geolocation, and the like. The IP address can include a 32-bit number (e.g., IPv4) or a 128-bit number (IPv6). The IP address can serve two primary functions. First, the IP address can identify the node, such as, for example, the identity of the server 15, routers 20-0 to 20-N, 30-0 to 30-N, controller 30 or communicating devices (not shown) in the node 10 or branch nodes 40-1 to 40-N. Second, the IP address can identify the location of the node, such as, for example, the geolocation of the server 15, routers 20-0 to 20-N, 30-0 to 30-N, controller 30, or database 60 in the network system 100.

FIG. 4 shows an example of the VPN bandwidth manager 200, which can be included in the server 15 (shown in FIG. 2). The VPN bandwidth manager 200 can be configured to implement the various aspects of the disclosure. The VPN bandwidth manager 200 can include a processor 210, a storage 220, a hard disk drive (HDD) 230A, an optical disk drive (ODD) 230B, a network interface 240, an input/output (I/O) interface 250, the API unit 260, a link capacity allocation (LCA) unit 270, and a system bus 205 that can be communicatively linked to each of the components in the VPN bandwidth manager 200 by a communication link.

The system bus 205 can be any of several types of bus structures that can further interconnect to a memory bus (with or without a memory controller), a peripheral bus, and a local bus using any of a variety of commercially available bus architectures.

The processor 210 can be any of various commercially available processors. Dual microprocessors and other multi-processor architectures can be employed as the processor.

The VPN bandwidth manager 200 includes a computer-readable medium that can hold executable or interpretable computer code (or instructions) that, when executed by the processor 210, cause the steps, processes and methods described herein to be carried out. The computer-readable medium can be provided in the storage 220, HDD 230A, or ODD 230B. The computer readable medium can include sections of computer code that, when executed by, for example, the processor 210, the API unit 260, and/or the LCA unit 270, can cause the VPN bandwidth manager 200 to carry out the VPN updating process 500 (shown in FIG. 7), and other processes described or contemplated herein.

The storage 220 includes a read only memory (ROM) 220A and a random-access memory (RAM) 220B. The storage 220 can store data and indexing data that links the stored data to a computing resource. A basic input/output system (BIOS) can be stored in the non-volatile memory 220A, which can include, for example, a ROM, an EPROM, an EEPROM, or the like. The BIOS can contain the basic routines that help to transfer information between components within the VPN bandwidth manager 200, such as during start-up. The RAM 220B can include a high-speed RAM such as static RAM for caching data.

The HDD 230A can include, for example, an enhanced integrated drive electronics (EIDE) drive, a serial advanced technology attachments (SATA) drive, or the like; and, the ODD 230B can read/write from/to a CD-ROM disk (not shown), or, read from or write to other high capacity optical media such as the DVD. The HDD 230A can be configured for external use in a suitable chassis (not shown). The HDD 230A and ODD 230B can be connected to the system bus 205 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The HDD 230A and/or ODD 230B, and their associated computer-readable media, can provide nonvolatile storage of data, data structures, computer-executable instructions, and the like. The HDD 230A and/or ODD 230B can accommodate the storage of any data in a suitable digital format. The storage 220, HDD 230A, and/or ODD 230B can include one or more apps that are used to execute aspects of the architecture described herein.

A number of program modules can be stored in the HDD 230A, ODD 230B, and/or RAM 220B, including an operating system (not shown), one or more application programs (not shown), other program modules (not shown), and program data (not shown). Any (or all) of the operating system, application programs, program modules, and program data can be cached in the RAM 220B as executable sections of computer code.

The network interface 240 can be connected to the network 50 (shown in FIG. 2) via the router 20-0 and/or router 30-0 (shown in FIG. 2). The network interface 240 can include a wired or a wireless communication network interface (not shown) and/or a modem (not shown). The network interface 240 can receive and transmit data packets between the VPN bandwidth manager 200 and one or more computing devices, including, for example the controller 30 (shown in FIG. 2). When used in a local area network (LAN), the VPN bandwidth manager 200 can be connected to the LAN network through the wired and/or wireless communication network interface, and, when used in a wide area network (WAN), it can be connected to the WAN network through the modem. The modem (not shown) can include an internal or external, or a wired or wireless modem. The modem can be connected to the system bus 205 via, for example, a serial port interface (not shown).

The (I/O) interface 250 can receive commands and data from an operator via the I/O interface, which can be communicatively coupled to one or more input/output devices, including, for example, a keyboard (not shown), a mouse (not shown), a pointer (not shown), a microphone (not shown), a speaker (not shown), a display (not shown), and/or the like. The received commands and data can be forward to the processor 210 from the I/O interface 250 as instruction and data signals via the bus 205.

The API unit 260 can include one or more application program interfaces (APIs). The APIs can include, for example, web APIs, simple object access protocol (SOAP) APIs, remote procedure call (RPC) APIs, representation state transfer (REST) APIs, or other utilities and services APIs.

The LCA unit 270 can be one or more devices or one or more modules that are separate from the processor 210, as seen in FIG. 4, or integrated with the processor 210. The LCA unit 270 can include one or more computing devices (not shown) or communicating devices (not shown). The LCA unit 270 can be connected to the system bus 205 and configured to receive at one or more inputs (not shown) and transmit at one or more outputs data and instruction signals. The LCA unit 270 can include one or more modules that can be configured to carry out changes to and control of bandwidth restrictions on one or more provisioned connectivity links, such as, for example, at the physical layer (e.g. layer 7 of the OSI model, shown in FIG. 3) or the data link layer (e.g., OSI layer 6, shown in FIG. 3). The LCA unit 270 can adjust and control bandwidth restrictions such that the sum of all bandwidths on all connectivity links in the VPN network connectivity bundle, including, e.g., any leased lines, is equal to, or less than the allocated aggregate bandwidth value $B_{TOTAL}$. The LCA unit 270 can be configured to carry out the VPN updating process 500, shown in FIG. 7.

FIG. 5 shows an example of the MN bandwidth manager 300, which can be included in the controller 30 (shown in FIG. 2). Referring to FIG. 5, the MN bandwidth manager 300 can include components 205 through 260 that are similar to, or substantially the same as correspondingly numbered components in the VPN bandwidth manager 200 (shown in FIG. 4). In order to avoid redundancy, the description provided above, with respect to components 205 through 260, is herein incorporated by reference in its entirety. The MN bandwidth manager 300 also includes a master node traffic capacity provisioning (MNTCP) unit 370.

The MN bandwidth manager 300 includes a computer-readable medium that can hold executable or interpretable computer code (or instructions) that, when executed by the processor 210, causes the steps, processes and methods described herein to be carried out. The computer-readable medium can be provided in the storage 220, HDD 230A, or ODD 230B. The computer-readable medium can include sections of computer code that, when executed by, for example, the processor 210, the API unit 260, and/or the MNTCP unit 370, cause the MN bandwidth manager 300 to carry out the VPN provisioning process 400 (shown in FIG. 6), and other processes described or contemplated herein.

The MNTCP unit 370 can be one or more devices or one or more modules that are separate from the processor 210, as seen in FIG. 5, or integrated with the processor 210. The MNTCP unit 370 can include one or more computing devices (not shown). The MNTCP unit 370 can be configured to carry out the VPN provisioning process 400 shown in FIG. 6. The MNTCP unit 370 can configure, set, and control connectivity links to/from the node 10 (shown in FIG. 2) and each of the branch nodes 40 (shown in FIG. 2). The MNTCP unit 370 can communicate with the server 15 (shown in FIG. 2) or the routers 30-0 to 30-N (or routers 20-0 to 20-N) and, in response to instructions and data received from the server 15 or any of the routers, the MNTCP unit 370 can change bandwidth allocations $B_1$ to $B_N$ for any of the plurality of provisioned connectivity links, such that the sum of all the allocated bandwidths remains constant, equal to, or less than the aggregate bandwidth value $B_{TOTAL}$ allocated to all of the connectivity links in the VPN network connectivity bundle.

Figure 6:
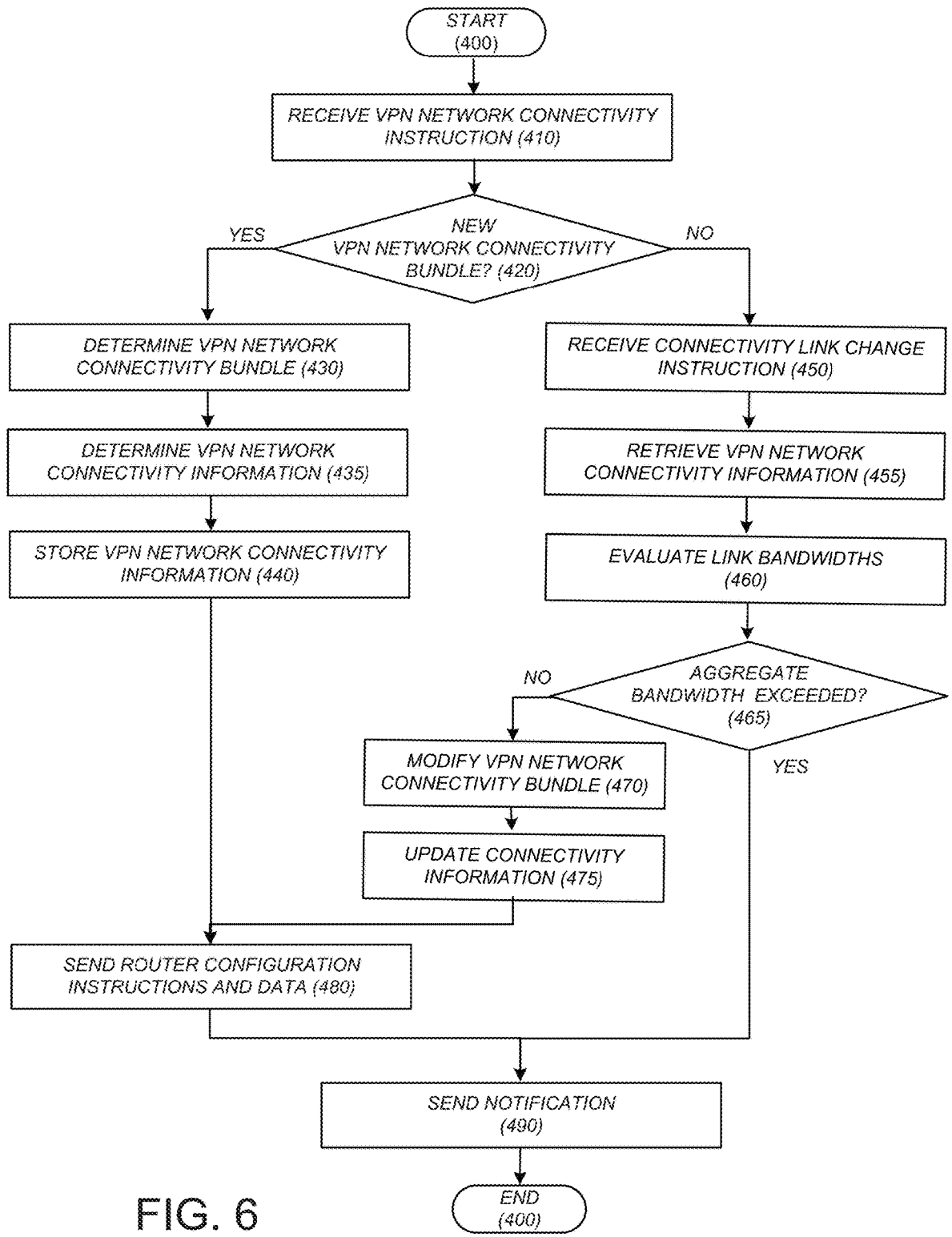
FIG. 6 shows an example of a virtual private network provisioning process, according to the principles of the disclosure.

FIG. 6 shows an example of the VPN provisioning process 400, according to the principles of the disclosure. As noted earlier, the VPN provisioning process 400 can be carried out by the controller 30 (shown in FIG. 2), and, more particularly, by the MN bandwidth manager 300 (shown in FIG. 5).

Referring to FIGS. 2 and 6, a network connectivity instruction (or request) signal can be received from any one or more of the routers 30-0 to 30-N (or any of routers 20-0 to 20-N) by the controller 30 (Step 410). Alternatively, the signal can be received from the server 15. A determination can be made by the controller 30 whether the received signal includes a request relating to a new VPN network connectivity bundle or a modification to be made to an existing VPN network connectivity bundle (Step 420).

If it is determined that the received network connectivity instruction signal relates to a new VPN network connectivity bundle to be formed (YES at Step 420), then the VPN network connectivity bundle can be determined for all nodes to be included in the VPN, including node 10 and branch nodes 40-1 to 40-N (Step 430). The determined VPN network connectivity bundle can include an aggregate bandwidth $B_{TOTAL}$ allocation for all connectivity links in the VPN network connectivity bundle, as well as the individual bandwidth allocations $B_0$ to $B_N$ for the connectivity links to the node 10 and to the branch nodes 40-1 to 40-N, respectively.

VPN network connectivity information can be determined for the VPN network connectivity bundle (Step 435). The VPN network connectivity information can include all information necessary for proper bandwidth allocation, connectivity between the node 10 and each branch node 40, and monitoring and management of connectivity usage data for all provisioned connectivity links. The connectivity usage data can be transmitted to a billing management system (not shown) located in the SP network 70 (or elsewhere) to carry out billing related to provisioning connectivity links to the node 10 and to each of the branch nodes 40-1 to 40-N. The VPN network connectivity information can be stored in the database 60 (Step 440).

The stored VPN network connectivity information can include the aggregate bandwidth $B_{TOTAL}$ value and each of the bandwidth $B_0$ to $B_N$ values allocated to the connectivity links to the node 10 and to each of the branch nodes 40-1 to 40-N, respectively. The stored information can include IP addresses for the routers 20-0 to 20-N and/or routers 30-0 to 30-N, IP addresses for the node 10 and branch nodes 40-1 to 40-N, geolocations for the routers 20-0 to 20-N and/or routers 30-0 to 30-N, geolocations for the node 10 and branch nodes 40-1 to 40-N, user identification, class of service information, and the like. The database 60 can include a storage area dedicated to the VPN network connectivity bundle, including all records and files associated with the VPN that includes the node 10 and branch nodes 40-1 to 40-N, including all provisioned connectivity links. The stored records and files can include historical data, including usage data for each provisioned connectivity link. The database 60 can include other storage areas dedicated to records and files associated with other VPN network connectivity bundles, which include provisioned connectivity links to other nodes (not shown) and their branch nodes (not shown).

If it is determined that the received network connectivity instruction signal relates to an existing VPN network connectivity bundle (NO at Step 420), then a connectivity link change instruction and associated data can be parsed from the data packets that include the received VPN network connectivity instruction, or the connectivity link change instruction can be received in a separate communication from the router that atomically communicated with the controller 30 or from the server 15 (Step 450). The connectivity link change instruction can include a request for a connectivity link bandwidth change, which can include a bandwidth upgrade or downgrade, removal of a connectivity link or location, or addition of a connectivity link or location. Based on the received network connectivity instruction signal, the controller 30 can access the appropriate data in the database 60 (or locally in the controller 30) and retrieve VPN network connectivity information associated with received connectivity link change instruction, including the associated aggregated bandwidth $B_{TOTAL}$ and the current bandwidth allocations $B_0$ to $B_N$ for all associated connectivity links in the VPN (Step 455).

The requested connectivity link bandwidth change(s) can be applied to the current bandwidth allocations, and the resultant bandwidth allocations (with the applied change(s)) can be calculated (Step 460). Based on the calculated values, a determination can be made whether the sum of all allocated bandwidths $B_0$ to $B_N$ (with the change(s) included) is greater than the aggregate bandwidth $B_{TOTAL}$ allocated for all connectivity links in the VPN (Step 465).

If it is determined that the sum of all allocated bandwidths $B_0$ to $B_N$ (with the change(s) included) is greater than the aggregate bandwidth $B_{TOTAL}$ (YES at Step 465), then a notification can be generated and sent to the router (or server 15) from which the connectivity link change instruction was received (Step 490), otherwise (NO at Step 465) the requested change can be made to the connectivity link in the VPN network connectivity bundle based on the received connectivity link change instruction (Step 470) and the associated VPN network connectivity information can be updated in the database 60 based on the modifications made to the connectivity link(s) in the VPN network connectivity bundle (Step 475). The notification can include, for example, a message signal that indicates denial of the requested connectivity link change.

After the VPN network connectivity information has been stored (Step 440) or updated (Step 470), the controller 30 can generate and send configuration instructions to an appropriate one or more of the routers 30-1 to 30-N (or routers 20-1 to 20-N, or the server 15) to apply the bandwidth change(s) to appropriate connectivity links (Step 480). The configuration change instructions can include router settings that can be implemented to apply the changes to the appropriate connectivity link(s), thereby ensuring proper provisioning of connectivity links in the VPN network connectivity bundle, including links to the node 10 and to the branch nodes 40-1 to 40-N. The controller 30 can request a confirmation signal from the reconfigured router(s) to ensure that each connectivity link bandwidth change has been implemented.

The controller 30 can generate and send a notification to the server 15 (Step 490). The notification can include a confirmation that the connectivity link bandwidth change(s) has been implemented. Upon receiving the confirmation notification from the controller 30, the server 15, and, more particularly, the VPN bandwidth manager 200 (shown in FIG. 4) can apply the necessary changes to the appropriate one(s) of routers 20-1 to 20-N. The confirmation notification can include router configurations and settings for proper configuration of the router(s).

Figure 7:
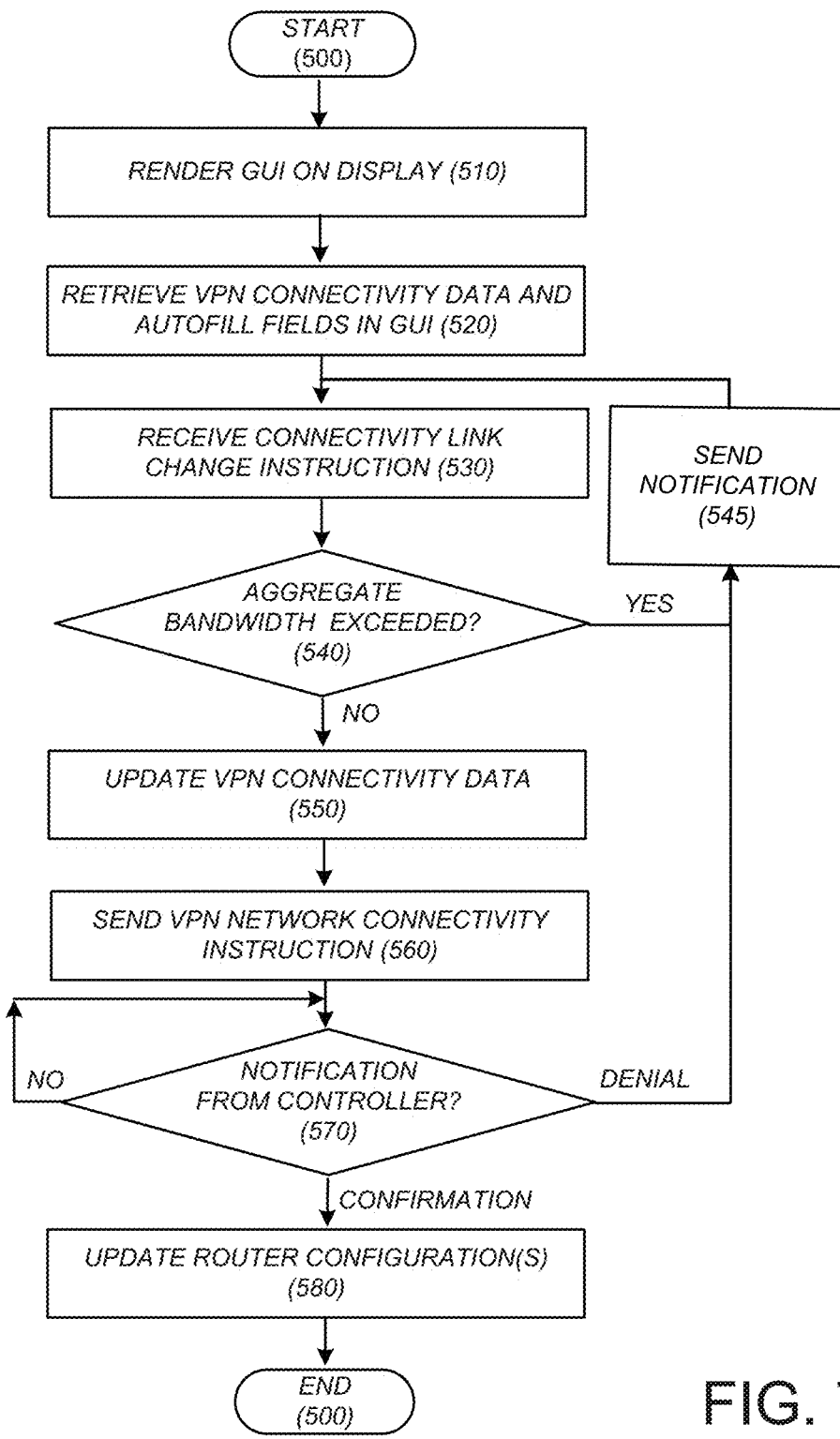
FIG. 7 shows an example of a virtual private network updating process, according to the principles of the disclosure.

FIG. 7 shows an example of a VPN updating process 500, according to the principles of the disclosure. The VPN updating process 500 can be carried out by the server 15 (shown in FIG. 2), and, more particularly, by the VPN bandwidth manager 200 (shown in FIG. 4).

FIGS. 8A and 8B show an example of displays 600A and 600B that can be rendered by a graphic user interface (GUI). The displays 600A and 600B can be rendered by GUI in the server 15 (shown in FIG. 2), and, more particularly, by the I/O interface 250 in the VPN bandwidth manager 200 (shown in FIG. 4).

Referring to FIG. 7, the VPN updating process 500 can initiate and prepare to receive connectivity link change instructions by, for example, rendering a GUI (e.g., display screen 600A, shown in FIG. 8A) on a display device (not shown) (Step 510). The GUI can be rendered with a plurality of fields that are configured to receive VPN provisioning instructions. The GUI can be configured to receive requests and instructions relating to a request type field and an associated value field, and, depending on the type of request, the data can be retrieved from storage (e.g., RAM 220B or HDD 230A or ODD 230B, shown in FIG. 4) and additional type fields and associated values can be autocompleted in the GUI (Step 520).

As seen in the example shown in FIG. 8A, upon receiving an "IP VPN Link" selection for the value associated with the request type, the aggregate bandwidth value data can be retrieved for the VPN (e.g., $B_{TOTAL}$=20 Mbps), as well as the associated location data and associated bandwidth assignment data for each connectivity link in the VPN (e.g., $B_0$=10 Mbps, $B_1$=2 Mbps, $B_2$=2 Mbps, $B_3$=2 Mbps, $B_4$=3 Mbps, $B_5$=1 Mbps, where N=5). In this example, the bandwidth allocated to the connectivity link to the node 10 is $B_0$, and the bandwidths allocated to the connectivity links to the branch nodes 40-1 to 40-5 are $B_1$ to $B_5$, respectively. Any of the values $B_0$ to $B_5$ can be changed. However, upon any of the values $B_0$ to $B_5$ being changed, a determination can be made (e.g., by the LCA 270, shown in FIG. 4) whether the sum of all the values $B_0$ to $B_5$ is equal to or less than aggregate bandwidth value $B_{TOTAL}$. Any change that results in the sum of all the values $B_0$ to $B_5$ exceeding the aggregate bandwidth value $B_{TOTAL}$ can be rejected, and a notification can be generated and rendered on the display device (not shown), indicating that the requested change is rejected. The notification can include a message (not shown) that is rendered by the GUI on the display device.

As seen in the example in FIG. 8A, the GUI can render an "ADD LOCATION" field and an "ADD VALUE" field, which can receive an instruction to add a new connectivity link for a location (e.g., a new location or one of the existing locations), as well as the bandwidth to be allocated to the new connectivity link. Similarly, the GUI can receive an instruction to remove any of the locations (e.g., branch nodes 1 to 5) and, thereby, remove any connectivity link(s) to the removed location(s).

A connectivity link change instruction can be received by the VPN bandwidth manager 200 (shown in FIG. 4), requesting that one or more of the connectivity links be upgraded, downgraded, removed, suspended, or added (Step 530). FIG. 8B shows an example where a request is received to upgrade the bandwidth allocated for the connectivity link to branch node 4 (i.e., branch node 40-4 in FIG. 2) from 3 Mbps to 4 Mbps. The request can be received via the GUI that renders the display 600B via router 20-0 (shown in FIG. 2), or directly from the router 20-4 (shown in FIG. 2), which routes traffic to/from the branch node 40-4. The received request can include a downgrade to the bandwidth allocated to the connectivity link to branch node 3 (i.e., branch node 40-3 in FIG. 2) from 2 Mbps to 1 Mbps, as seen in FIG. 8B.

After receiving the connectivity link change instruction, a determination can be made whether the sum of allocated bandwidths $B_0$ to $B_5$ for all the connectivity links is greater than the aggregate bandwidth $B_{TOTAL}$ allocated to the VPN in the VPN network connectivity bundle (Step 540). If it is determined that the sum of all allocated bandwidths $B_0$ to $B_5$ is greater than the aggregate bandwidth $B_{TOTAL}$ (YES at Step 540), then a notification can be generated and sent (or rendered) (Step 545), otherwise (NO at Step 540) the VPN connectivity data can be updated with the updated data (Step 550) and a VPN network connectivity instruction generated and sent to the controller 30 (Step 560). The VPN network connectivity instruction can be sent from, for example, the VPN bandwidth manager 200 (shown in FIG. 4) via router 20-0 (shown in FIG. 2), or from any of the particular router(s) that are affected by the change.

The notification can include a message that indicates that the changes cannot be accepted because the sum of the resultant bandwidth allocations exceed the aggregate bandwidth. The message signal can be rendered on the display device (not shown) by the GUI. The notification can include a prompt for further connectivity link change instructions to be provided, which can be received (Step 530).

After the VPN network connectivity instruction is sent to the controller 30 (Step 560), a determination can be made whether a notification is received from the controller 30 (Step 570). If a notification is received from the controller 30 and the notification includes a confirmation that the requested change(s) has been accepted and implemented (CONFIRMATION at Step 570), then the necessary configuration changes are made to the appropriate one or more routers 20-0 to 20-N (Step 580). However, if the received notification includes a denial of the requested change (DENIAL at Step 570), then a notification can be generated and sent (or rendered) (Step 545) and Steps 530 to 570 carried out.

The terms "a," "an," and "the," as used in this disclosure, means "one or more," unless expressly specified otherwise.

The term "communicating device," as used in this disclosure, means any computing device, hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computing resource," as used in this disclosure, means software, a software application, a web application, a web page, a computer application, a computer program, computer code, machine executable instructions, firmware, or the like. A computing resource can include an email account, a user account, a network account, or the like.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a computing device or a computing resource, can cause the computing device or computing resource to carry out a predetermined function or task. The data packet can include a data signal that, when received by a computing device or a computing resource, can be implemented in carrying out a predetermined function or task, or processed to render information.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP, etc.

The term "node," as used in this disclosure, means a communicating device and/or a computing resource, or a combination or a network of communicating devices and/or computing resources.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for provisioning a network connectivity link to a node in a virtual private network, the method comprising:

receiving a network connectivity instruction signal;

parsing a connectivity link change request that includes a request to change a bandwidth allocation for the network connectivity link from the network connectivity instruction signal when the network connectivity instruction signal relates to a virtual private network connectivity bundle;

retrieving network connectivity information that includes an aggregate bandwidth value for the virtual private network and bandwidth values for all network connectivity links in the virtual private network, including a current bandwidth value for said network connectivity link;

applying the request to change the bandwidth allocation to the current bandwidth value and changing the bandwidth allocation for said network connectivity link of the virtual private network connectivity bundle to an updated bandwidth allocation;

evaluating the bandwidth values for all network connectivity links in the virtual private network, including the updated bandwidth allocation, to determine a sum of bandwidths;

comparing the sum of bandwidths to the aggregate bandwidth value;

determining whether the sum of bandwidths exceeds the aggregate bandwidth value;

modifying the virtual private network connectivity bundle; and configuring a router with the updated bandwidth allocation to effectuate the updated bandwidth allocation in said network connectivity link when it is determined that the sum of bandwidths is equal to, or less than the aggregate bandwidth value.

2. The method in claim 1, wherein the connectivity link change request is received from a network router located in the node.

3. The method in claim 1, wherein the connectivity link change request is received from a server located in the node.

4. The method in claim 1, the method further comprising:
sending a notification to the node,
wherein the notification includes a confirmation that the request to change the bandwidth allocation for said network connectivity link is effectuated.

5. The method in claim 4, wherein the notification includes a router configuration that effectuates the request to change the bandwidth allocation.

6. The method in claim 1, the method further comprising:
updating virtual private network connectivity bundle information in a database, the updating being based on the request to change the bandwidth allocation.

7. A system for provisioning a network connectivity link to a node in a virtual private network, the system comprising:

a database that stores network connectivity information for the virtual private network; and a controller that:

receives a connectivity link change request that includes a request to change a bandwidth allocation for said network connectivity link;

retrieves an aggregate bandwidth value for the virtual private network and bandwidth values for all network connectivity links in the virtual private network from the database, including a current bandwidth value for said network connectivity link;

applies the request to change the bandwidth allocation to the current bandwidth value and changes the bandwidth allocation for said network connectivity link of the virtual private network connectivity bundle to an updated bandwidth allocation;

evaluates the bandwidth values for all network connectivity links in the virtual private network, including the updated bandwidth allocation, to determine a sum of bandwidths;

compares the sum of bandwidths to the aggregate bandwidth value;

determines whether the sum of bandwidths exceeds the aggregate bandwidth value; and sends via a network interface a router configuration with the updated bandwidth allocation to effectuate the updated bandwidth allocation in said network connectivity link when it is determined that the sum of bandwidths is equal to, or less than the aggregate bandwidth value.

8. The system in claim 7, wherein the connectivity link change request is received from a network router located in the node.

9. The system in claim 7, wherein the connectivity link change request is received from a server located in the node.

10. The system in claim 7, wherein the controller sends a notification to the node that includes a confirmation that the request to change the bandwidth allocation for said network connectivity link is effectuated.

11. The system in claim 10, wherein the notification includes a router configuration that effectuates the request to change the bandwidth allocation.

12. The system in claim 7, wherein the network connectivity information in the database comprises virtual private network connectivity bundle information that is updated based on the request to change the bandwidth allocation.

13. A non-transitory computer readable storage medium storing network connectivity link provisioning program instructions for causing a network connectivity link to be provisioned to a node in a virtual private network, the program instructions comprising the steps of:

receiving a connectivity link change request that includes a request to change a bandwidth allocation for the network connectivity link;

retrieving network connectivity information that includes an aggregate bandwidth value for the virtual private network and bandwidth values for all network connectivity links in the virtual private network, including a current bandwidth value for said network connectivity link;

applying the request to change the bandwidth allocation to the current bandwidth value and changing the bandwidth allocation for said network connectivity link of the virtual private network connectivity bundle to an updated bandwidth allocation;

evaluating the bandwidth values for all network connectivity links in the virtual private network, including the updated bandwidth allocation, to determine a sum of bandwidths;

comparing the sum of bandwidths to the aggregate bandwidth value;

determining whether the sum of bandwidths exceeds the aggregate bandwidth value; and configuring a router with the updated bandwidth allocation to effectuate the updated bandwidth allocation in said network connectivity link when it is determined that the sum of bandwidths is equal to, or less than the aggregate bandwidth value.

14. The non-transitory computer readable storage medium in claim 13, wherein the connectivity link change request is received from a network router or a server located in the node.

15. The non-transitory computer readable storage medium in claim 13, the program instructions comprising the further step of sending a notification to the node, wherein the notification includes a confirmation that the request to change the bandwidth allocation for said network connectivity link is effectuated.

16. The non-transitory computer readable storage medium in claim 15, wherein the notification includes a router configuration that effectuates the request to change the bandwidth allocation.

17. The non-transitory computer readable storage medium in claim 13, the program instructions comprising the further step of updating virtual private network connectivity bundle information in a database, the updating being based on the request to change the bandwidth allocation.

* * * * *